United States Patent [19]

Takatori et al.

[11] Patent Number: 5,416,850

[45] Date of Patent: *May 16, 1995

[54] ASSOCIATIVE PATTERN CONVERSION SYSTEM AND ADAPTION METHOD THEREOF

[75] Inventors: Sunao Takatori; Ryohei Kumagai; Makoto Yamamoto, all of Tokyo, Japan

[73] Assignee: Ezel, Incorporated, Tokyo, Japan

[*] Notice: The portion of the term of this patent subsequent to Aug. 13, 2008 has been disclaimed.

[21] Appl. No.: 33,465

[22] Filed: Mar. 18, 1993

Related U.S. Application Data

[63] Continuation of Ser. No. 742,340, Aug. 8, 1991, abandoned, which is a continuation of Ser. No. 295,763, Jan. 11, 1989, Pat. No. 5,040,230.

[30] Foreign Application Priority Data

| Jan. 11, 1988 | [JP] | Japan | 63-3584 |
| Feb. 17, 1988 | [JP] | Japan | 63-34844 |
| May 23, 1988 | [JP] | Japan | 63-125477 |
| Jul. 1, 1988 | [JP] | Japan | 63-164235 |
| Nov. 4, 1988 | [JP] | Japan | 63-278946 |
| Nov. 25, 1988 | [JP] | Japan | 63-297541 |

[51] Int. Cl.⁶ ............................................. G06K 9/62
[52] U.S. Cl. ...................................... 382/159; 395/21
[58] Field of Search ................ 382/14, 15, 34, 54; 364/807, 513; G06K 9/62, 9/68, 9/40; G06G 7/00; 395/20, 21-23

[56] References Cited

U.S. PATENT DOCUMENTS

| 3,209,328 | 9/1965 | Bonner | 382/15 |
| 3,218,475 | 11/1965 | Hiltz | 307/201 |
| 3,310,783 | 3/1967 | Putzrath | 395/775 |
| 3,310,784 | 3/1967 | Hilinski | 395/500 |
| 3,325,787 | 6/1968 | Angell et al. | 382/14 |
| 3,408,627 | 10/1968 | Kettler et al. | 382/15 |
| 3,435,422 | 3/1969 | Gerhardt et al. | 395/75 |
| 3,601,811 | 8/1971 | Yoshino | 395/27 |
| 3,602,888 | 8/1971 | Nishiyama et al. | 395/550 |
| 3,638,196 | 1/1972 | Nishiyama et al. | 395/275 |
| 4,326,259 | 4/1982 | Cooper et al. | 364/715 |
| 4,660,166 | 4/1987 | Hopfield | 364/807 |
| 4,730,295 | 3/1988 | Bressers | 369/46 |
| 4,760,604 | 7/1988 | Cooper et al. | 382/15 |
| 4,783,830 | 11/1988 | Johnson et al. | 582/34 |
| 4,803,736 | 2/1989 | Grossberg et al. | 382/22 |
| 4,805,225 | 2/1989 | Clark | 382/15 |
| 4,887,306 | 12/1989 | Hwang et al. | 382/54 |
| 5,040,230 | 8/1991 | Takatori et al. | 382/15 |

OTHER PUBLICATIONS

Minsky et al, *Peceptrons*, Chapter 13, pp. 157–169, 1969.
Kohonen, "An Introduction to Neural Computing", *Neural Networks*, vol. 1, pp. 3–16, 1988.

*Primary Examiner*—Yon Y. Couso
*Attorney, Agent, or Firm*—Cushman, Darby & Cushman

[57] ABSTRACT

An associative pattern conversion system is disclosed which may be used for image recognition. The system includes an image input portion, an image processing portion and a recognition portion. The image processing portion includes a process unit for extracting characteristics and a frame memory for holding image data. The recognition portion, which includes a component for the learning of data to be associated, obtains the extracted characteristics from the image processing portion and performs associative pattern conversion from the image input portion. The system of the present invention may be applied to any neural network, preferably a matrix calculation type neural network.

5 Claims, 20 Drawing Sheets

FIG. 12
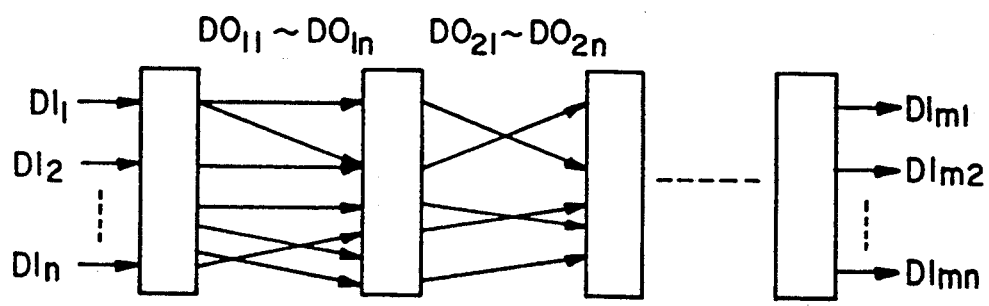
FIG. 13a
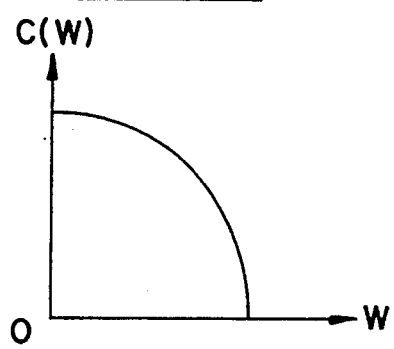
FIG. 13b
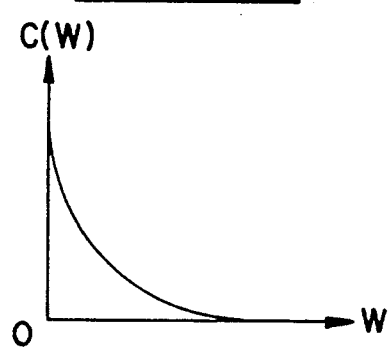
lFIG. 13c
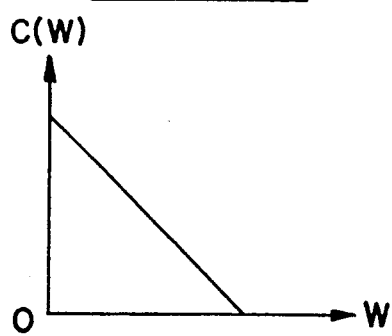
FIG. 13d
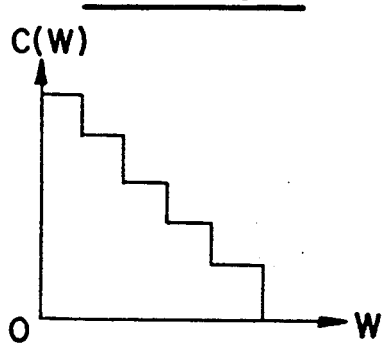

$$S \times C(W_i) \times DO \times DI_j$$

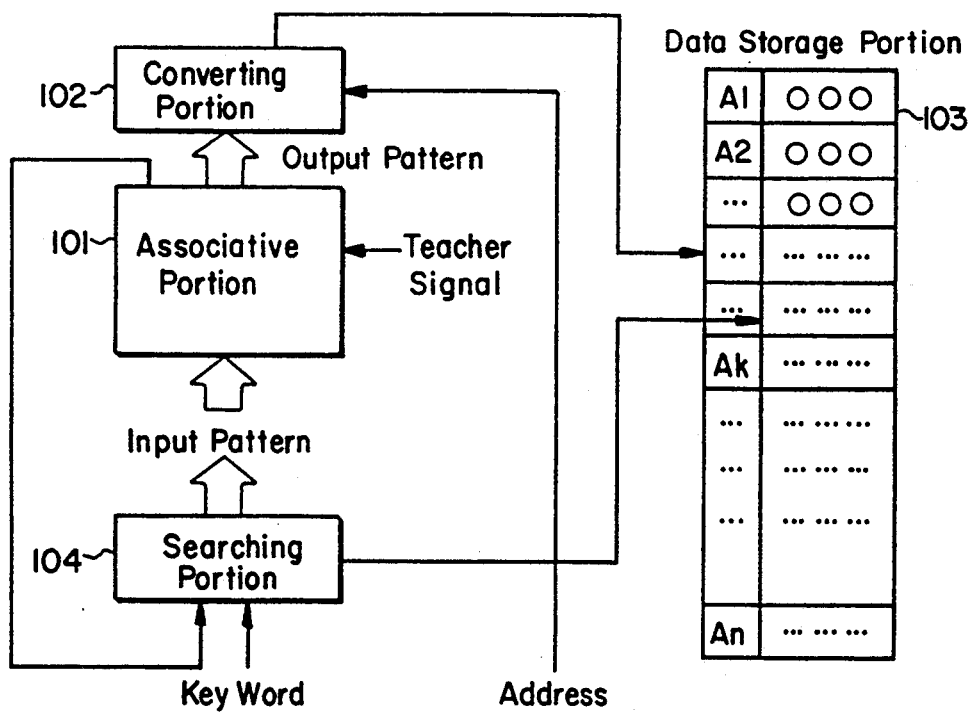

ASSOCIATIVE PATTERN CONVERSION SYSTEM AND ADAPTION METHOD THEREOF

This a Rule 62 FWC of application Ser. No. 07/742,340 filed Aug. 8, 1991, now abandoned, which is a Rule 60 continuation of application Ser. No. 07/295,763 filed Jan. 11, 1989, now U.S. Pat. No. 5,040,230.

BACKGROUND OF THE INVENTION

The present invention relates to an associative pattern conversion system and adaptation method thereof.

Conventionally, pattern-matching was applied to character or acoustic recognition. On such recognition, it has been impossible to judge an input-signal exactly unless there is high coincidence between the input signal and the registered pattern.

On the other hand, various models of neural network based on a neuron model has been proposed. One neuron model was announced by W. S. McCloch and W. H. Pitts in Massachusetts Institute of Technology in U.S.A. in 1943. It was then proved that associative pattern-matching is possible by using neural network by F. Rosenblatt.

However, it is impossible to realize a neural network with an integrated circuit; that is, it is impossible to realize the circuit with practical possibility, using all of present technology of semiconductors because an enormous number of output pins are necessary to output the associative pattern.

For example, when a character is input as a binary pattern of $32 \times 32$ dots, $10^6 (=(32^2)^2)$ neurons are necessary to process the input as an orthogonal data and $10^6$ output pins are necessary to output the ignition pattern of all these neurons.

There was some attempts to realize neuron model by software or hardware.

When the neuron model is realized by software, enormous memory is spent and the process speed is far from practical use.

When the neuron model is realized by hardware, the system is not amendable to slight modifications of the neuron model due to its lack of flexibility. The neuron model usually had to be simplified because of the difficulty in electronically regenerating the neuron model in a strict meaning.

SUMMARY OF THE INVENTION

Therefore, the present invention has an object to provide an associative pattern conversion system realized by practical technology and of high process speed.

According to the present invention, when the associative pattern conversion system is realized by an electronic circuit, flexible process units are connected with memory through a local bus, and minimal data is stored in the memory. When the associative pattern conversion system is realized by optical circuit, the non-linear optical characteristics are controlled.

BRIEF DESCRIPTION OF DRAWINGS

FIG. 12 shows a model of N layers neural network;

FIGS. 13 (a) to (d) are diagrams showing characteristics of weight function;

FIG. 25 is a block diagram of the sixth embodiment of the present invention;

FIG. 26 is a table showing a data stored within a converting portion;

FIG. 27 shows an example of a data to be associated;

DETAILED DESCRIPTION OF PREFERRED EMBODIMENTS

Hereafter, preferred embodiments of the present invention are described in detail.

Figure 1:
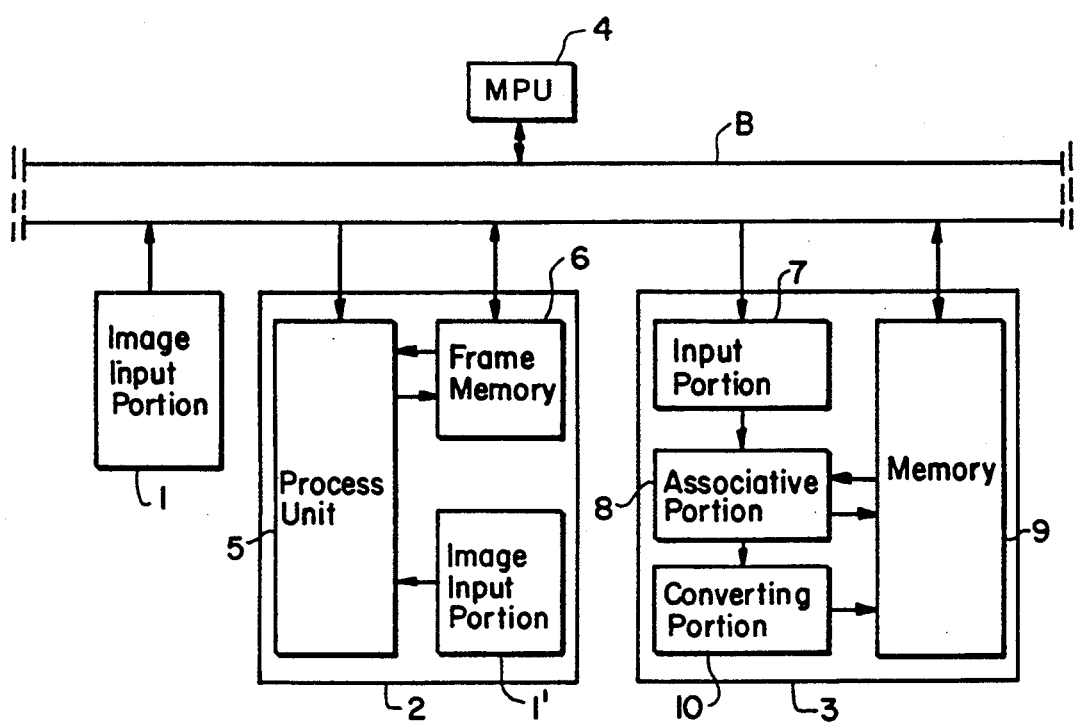
FIG. 1 shows an image recognition system to which the first embodiment of the present invention is applied.

FIG. 1 shows an image recognition system using the first embodiment of an associative pattern converting system of the present invention.

The image recognition system comprises an image input portion 1, an image processing portion 2 and a recognition portion 3, which are connected through bus B with one another as well as with MPU 4. The image input portion 1 includes an input apparatus such as an image scanner. The image input portion 1 may also includes input/output interface, data compression means and data holding means.

The image processing portion 2 comprises a process unit 5 for extracting characteristics and a frame memory 6 for hold image data. An image input portion 1' may be included in the image processing portion 2.

The recognition portion 3 comprises an input portion 7 to which extracted characteristics of an image are input, an associative portion 8 which performs associative pattern conversion of inputted data from the input portion 7 and a converting portion 10 for converting associated data from the associative portion 8 into an address which indicates stored data in a memory 9 corresponding to the associated data.

Figure 2:
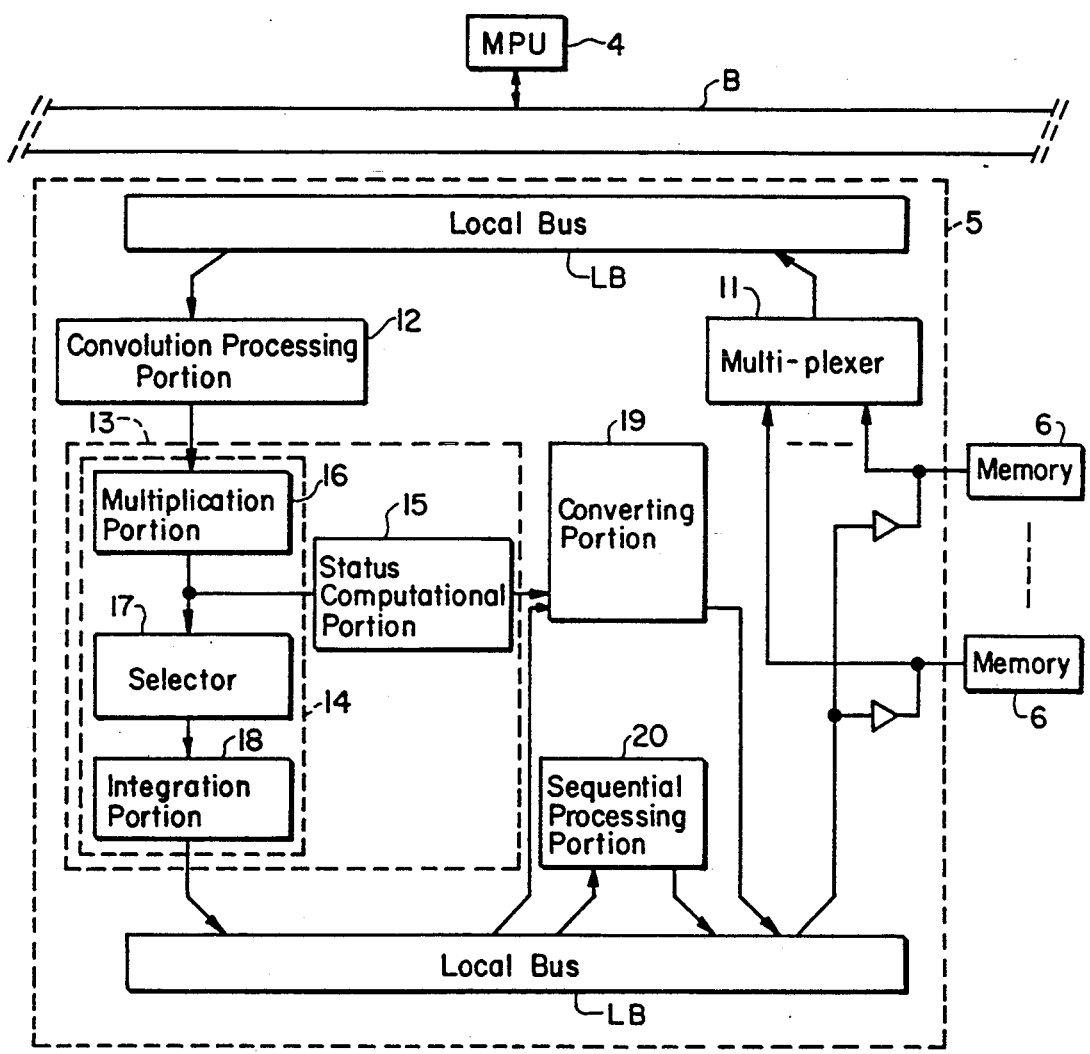
FIG. 2 shows a process unit in the system of FIG. 1.

FIG. 2 shows the process unit 5 in which selectively inputted data through the multiplexer 11 from the frame memory 6 is transmitted through a local bus LB to a convolution processing portion 12. The convolution processing portion 12 holds image data by a predetermined convolution area, for example 3×3, then transmits the data in parallel to a computational portion 13. The computational portion 13 includes numerical computational portion 14 and a status computational portion; the output of the convolution processing portion 12 is input to the numerical computational portion 14 first. The numerical computational portion 14 comprises a multiplication portion 16, selector 17 and integration portion 18, which are connected successively. The numerical calculation portion 14 processes differentiation operation or any other operations including calculation between images. In the typical numerical calculation, the density of each pixel is multiplied by a multiplier, then the total multiplication results are integrated.

It has been discovered that a density value of one pixel is never multiplied by two or more multipliers of different absolute values in one operation even when the density value of one pixel is applied two or more times in one operation. Therefore, the multiplication portion is positioned on the first position of the numerical computational portion 14 so that the number of multiplication kernals is minimized to be the same as the number of pixels simultaneously processed. The number of gates included in the circuits following the multiplication portion 16 such as selector 17 and integrating portion 18 is minimized. Thus the numerical computational portion has maximal performance as well as high process speed with minimal circuit size.

A data flow line is provided from within the numerical computational portion 14 to the status computational portion 15.

The status computational portion 15 performs the judgment or calculations such as follows:
i) A judgment whether the center pixel.
ii) A judgment whether there is a pixel.
iii) A judgment as to which pixel in 8 neighbors has similar density to that of the center pixel.
iv) A calculation of the number of the elements T, F, D and E of an Euler number.
v) A calculation of the identification ratio of an inputted pattern on comparing with a registered pattern.

Since the numerical calculation and status calculation are performed in parallel and independent from each other, each circuit for each calculation is efficient and has high process speed. The output of the status computational portion 15 is effective characteristics of effective data for extracting characteristics. The output from the status computational portion 15 is input to a converting portion 19 which performs characteristics extraction as well as calculation characteristics value through integration, computation and so forth.

The converting portion 19 comprises a high speed memory such as static RAM (random access memory) and a light computational portion connected to a branch of an output of the high speed memory. The output of the light computational portion is fed back to an input of the high speed memory. This construction enables high speed processing of recursive calculation, integration, sequential comparison or other complex calculation by a small circuit.

The computational portion 13 and converting portion 19 output data through a local bus LB for output to one of the frame memories 6.

A sequential processing portion 20 is connected to the local bus LB. The sequential processing portion 20 processes sequential process of labeling and thinning. The sequential processing portion 20 comprises a line memory and latches for holding (1H−5) pixel' processed data including data on the previous scan line, as well as a logical portion for processing each pixel referring the processed data in the predetermined convolution around each pixel.

The MPU 4 extracts various characteristics in high speed, so effective characteristics are supplied to the recognition portion 3. When a dual port memory is used for the frame memory 6, data is read from and write to the frame memory 6 in high speed.

Figure 3:
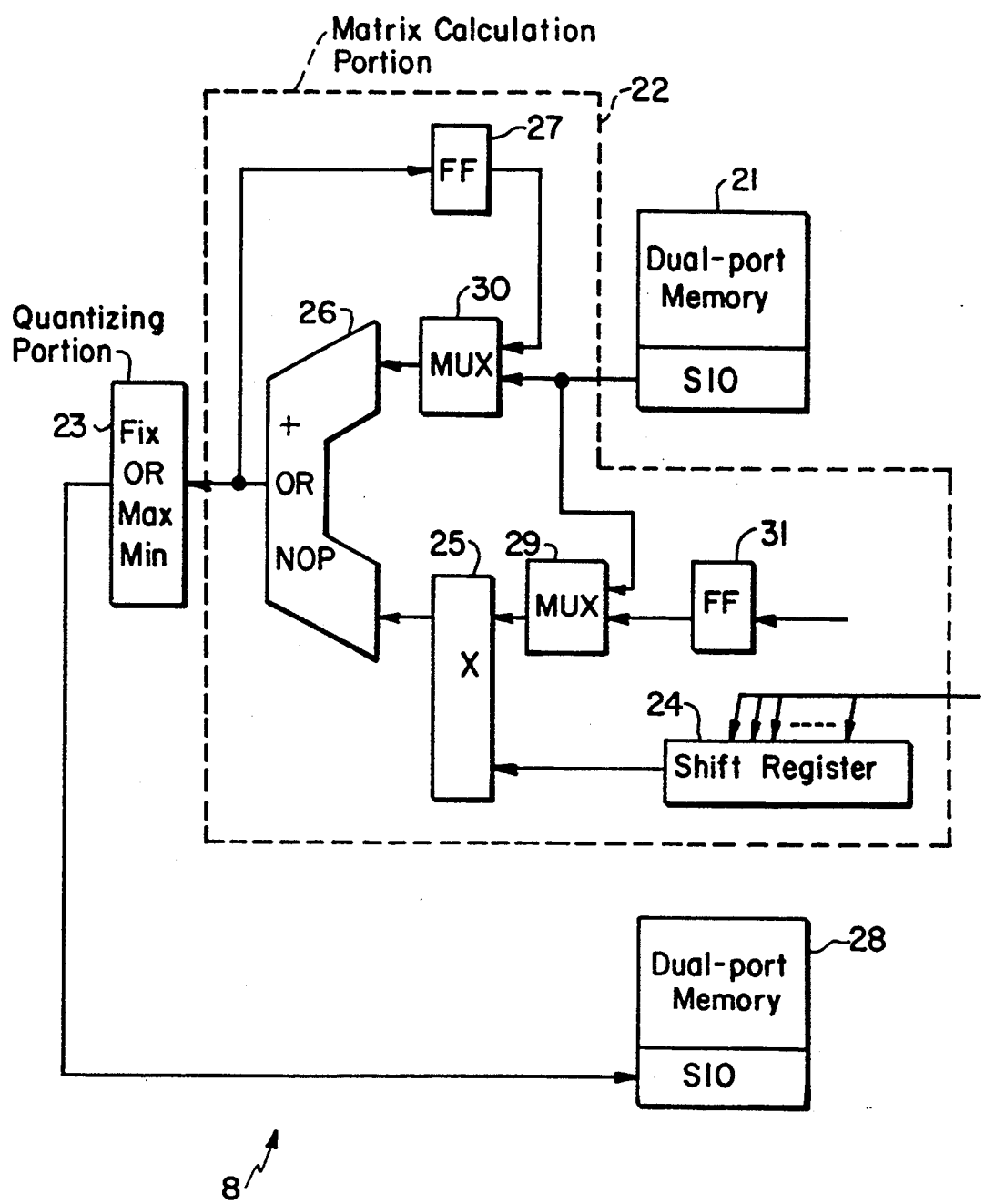
FIG. 3 shows a matrix calculation portion as an associative portion in FIG. 1.

The associative portion 8 of the recognition portion 3 comprises for example a circuit in FIG. 3.

In the circuit, a matrix calculation concerning memory matrix is performed as follows:

$$\vec{z} = \phi O \{M\vec{y}\}$$

$$M = \vec{x}\vec{x'}$$

where,
$\vec{x}$: memory stored (lateral vector);
$\vec{x}40$ : transported matrix of $\vec{x}$;
M: memory matrix;
$\vec{y}$: transposed matrix of input matrix (lateral vector);
$\phi O$: quantizing function, which converts positive element of matrix to "1", zero element to "0" and negative element to "−1";
$\vec{z}$: associative result (lateral vector)

The recognition portion 3 comprises a dual port memory 21, the serial I/O (SIO) of which is connected to a associative portion or matrix calculation portion 22. The output of the matrix calculation portion is connected to a quantizing portion 23.

In the memory 21, a matrix generated by multiplication of $\vec{x}$ and $\vec{x}'$ is stored. When $\vec{x}$ is n-rows matrix, the matrix of $\vec{x} \times \vec{x}'$ becomes n×n matrix. Elements in one row of the matrix is transmitted to serial access memory SAM of the dual port memory 21 in one clock cycle, and each element of the row in SAM is read from the serial I/O SIO in one clock cycle. Therefore, the matrix data in the memory 21 is read out quickly.

The matrix calculation portion 22 has an input portion for association 24 which consists for example of a shift register for string input matrix $\vec{y}$. Each element of $\vec{y}$ in the input portion 24 is multiplied with a corresponding element outputted from SIO by a multiplication circuit 25, and the multiplication results are integrated by an adder portion 26. For this addition, the adder portion 26 is provided with a holding portion 27 such as a flip-flop which holds temporarily the integrating value and finally the integration result.

The integration result ps $$M \times \vec{y}'$$

is input to the quantizing portion 23.

The quantizing portion 23 converts each element of $M \times \vec{y}'$ to "1", "0" or "−1" when the element is positive, zero and negative, respectively. The converted value is stored in the second dual port memory 28.

Figure 4:
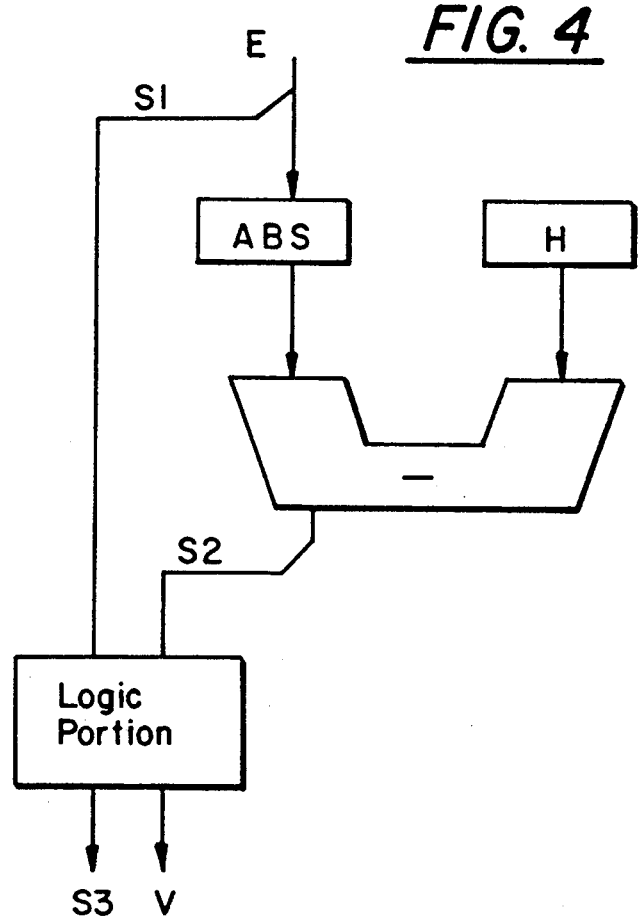
FIG. 4 shows a quantizing portion in the associative portion in FIG. 1.

The quantizing portion 23 is constructed for example as shown in FIG. 4. In the quantizing portion 23, an absolute value of an element E is compared with a threshold H so that a comparison result is outputted as a sign flag S2. The sign flag S1 of the element E and the sign flag S2 are input to a logic portion, then an absolute value V and a sign flag S3 of a quantized value are output from the logic portion, according to the calculation below.

$$S3 = S1 \times S2$$

$$V = S2$$

The truth table of the above calculation is as follows:

TABLE 1

| S1 | 0 | 0 | 1 | 1 |
|---|---|---|---|---|
| S2 | 0 | 1 | 0 | 1 |
| S3 | 0 | 0 | 1 | 0 |
| V  | 1 | 0 | 1 | 0 |

The input matrix $\vec{y}$ is generated by the image processing portion as a characteristic value. When input matrix has a size of $30 \times 30$ elements and each element has a size of 1 byte, the matrix M has a size of $900 \times 900$ bytes. Since an ordinal dual portion memory has a unit read out time of 40nsec/byte, it takes only $$40 \times 10^{-9} \times 900 \times 900 = 32.4 \text{nsec}$$

for the above matrix calculation.

When a pipe-line construction is applied to the recognition portion, the process speed is improved. The second dual port memory 28 can be omitted by writing the calculation result in the first memory 21 from which the data for calculation is read out.

The matrix calculation portion 22 further comprises a component for learning, one of the associative portion and learning portion is alternatively selectable by a multiplexer.

The multiplication portion 25 is connected with a multi-plexer 29 for selecting the serial output or the input pattern, alternatively. The adder portion 26 is connected with a multi-plexer 30 for selecting the output of the holding portion 27 or the serial output.

A input pattern for leaning is a matrix generated by multiplying the input pattern by a transposed matrix of the input pattern. For calculating one element of the matrix, each element of the vector stored in the shift register 24 is multiplied by one of the elements and all the multiplication results are integrated. The one element as a multiplier is held in a holding portion 31.

The matrix generated by the above calculation is added to the memory matrix H in the adder portion 26.

The quantizing portion 23 can be defined to limit the maximum value of each element so that when an element after the learning above has a value greater than the maximum, the element is converted to the maximum value. Without such limitation, a value exceeding the maximum may be returned to a small value, line ring counter.

In the memory 9, elements of the memory matrix and data to be associated are stored; for example, a character codes set of Chinese characters may be data to be associated. On association, each element of the memory matrix is transmitted to the dual port memory 21 of the associative portion 8. When the data is a character codes set, the character can be directly designated. It is also possible to convert the output of the associative portion 8 by a converting portion 10 to a character code.

The construction of the associative portion 8 is not limited by the construction above as shown in FIG. 3. A connection machine or any other neural network can be applied. However, considering the current semi-conductor technology, matrix calculation type neural network is practical.

The image processing portion can be changed to any high speed image processing means for extracting various characteristics.

The second embodiment of the present invention is shown in FIGS. 5 to 18.

Figure 5:
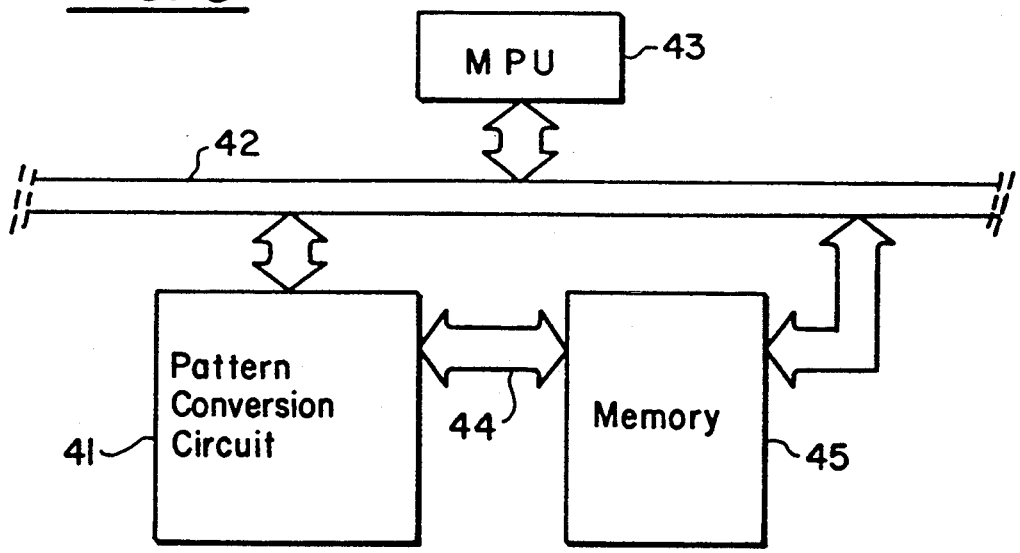
FIG. 5 shows the second embodiment of the present invention.

The associative pattern conversion system shown in FIG. 5 comprises a pattern conversion circuit 41 connected with a MPU 43 through a system bus 42. The pattern conversion circuit 41 is connected with a memory 45 through a local bus 44.

Figure 6:
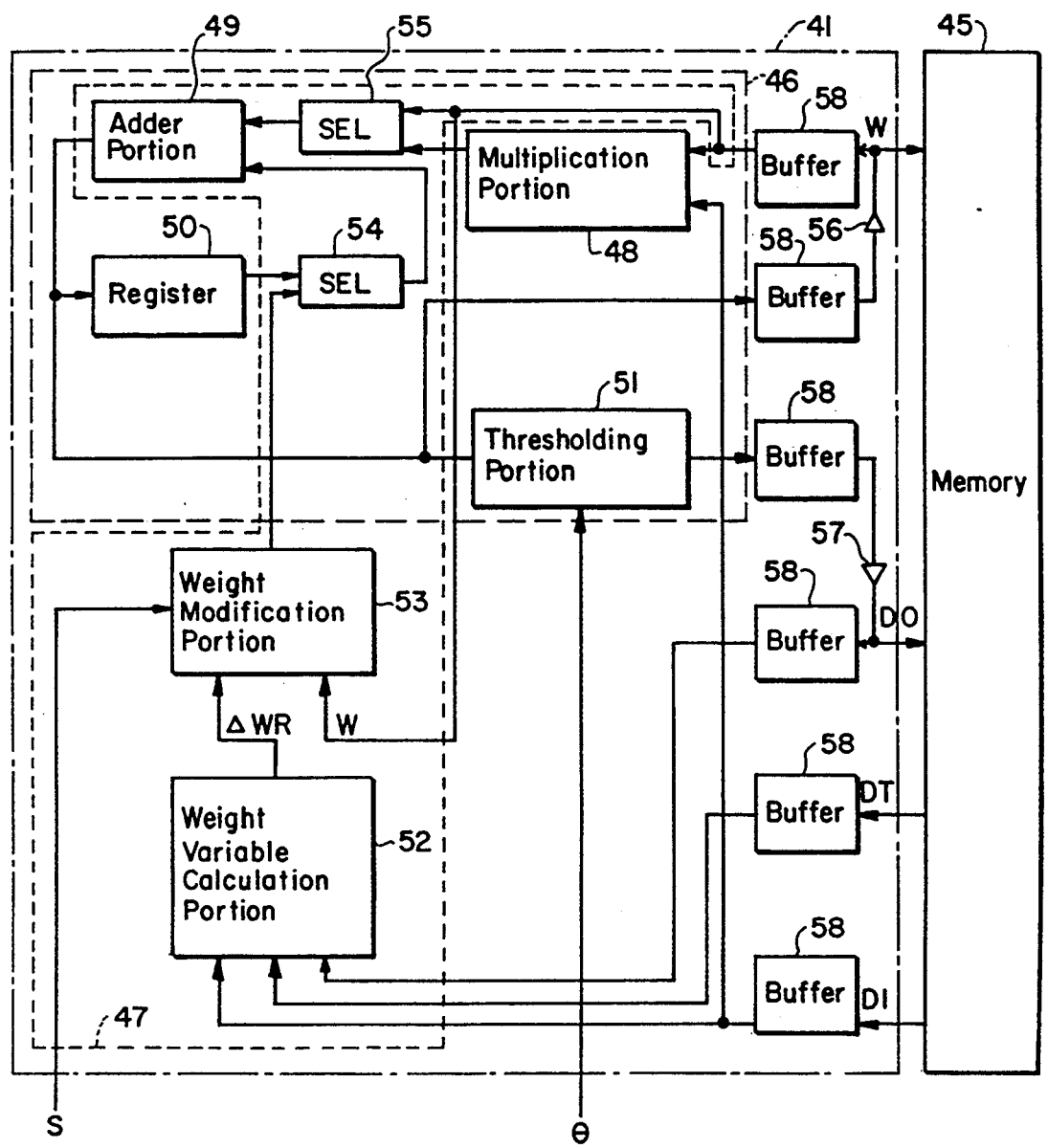
FIG. 6 shows a pattern conversion circuit in the embodiment of FIG. 5.
Figure 7A:
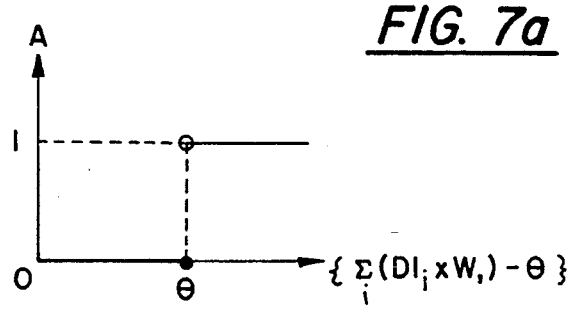
FIGS. 7 (a) to (d) show diagrams of the output signal.
Figure 7B:
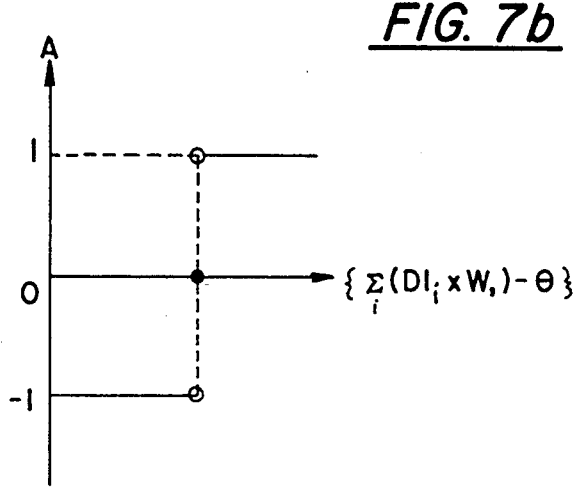
Figure 7C:
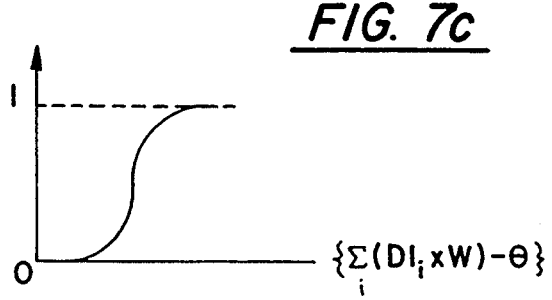
Figure 7D:
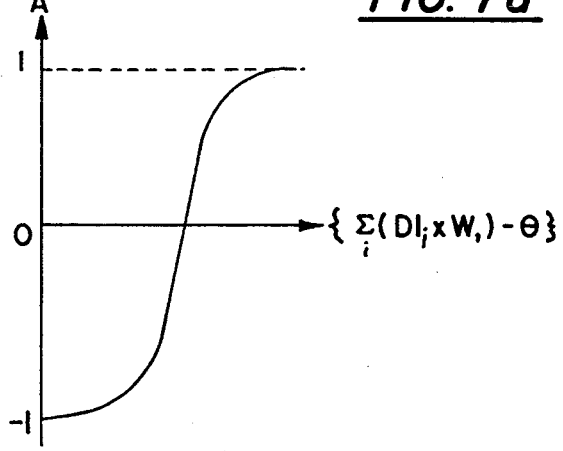
Figure 8A:
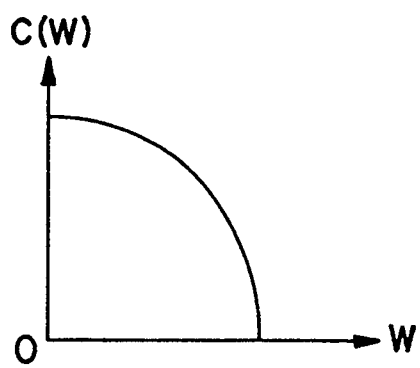
FIGS. 8 (a) to (d) show diagrams of the weight variable.
Figure 8B:
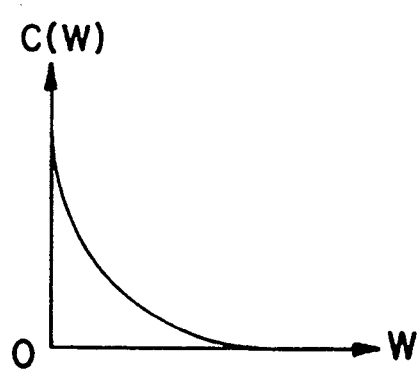
Figure 8C:
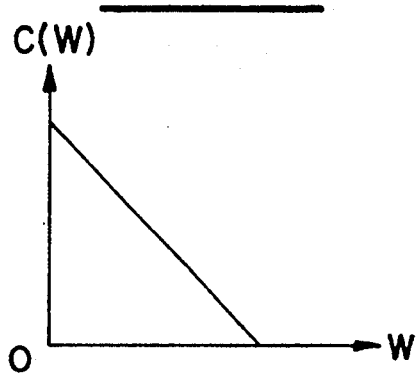
Figure 8D:
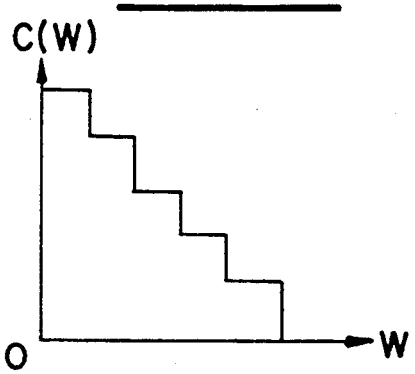
Figure 9:
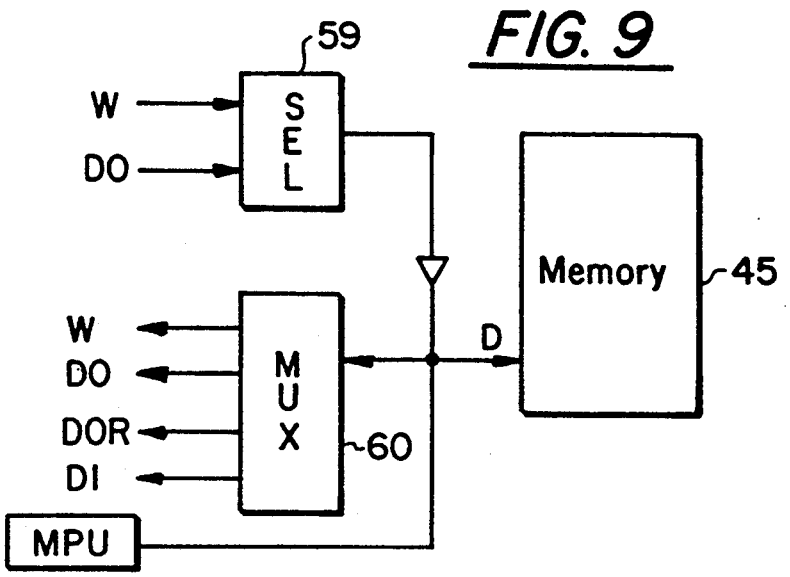
FIG. 9 shows selector and multiplexer for the circuit in FIG. 6.

The pattern conversion circuit 41 is shown in detail in FIG. 6, wherein the interconnection between the circuit 41 and the memory 45 is simplified for easy understanding.

The pattern conversion circuit 41 is provided with an associative portion 46 and learning portion 47, whereby common circuits are used by both portions so that the total construction is efficient and small.

The associative portion 46 comprises a multiplication portion 48 to which data from the memory 45 is input. The output of the multiplication portion 48 is input to an adder portion 49, the output of which is once held in a register 50 then fed back to an input of the adder portion 49. An input pattern data DI and a data as a parameter for association are input to the multiplication portion 48 which multiplies one data by the other. The parameter for association is for example a weight W of a synapse.

The adder portion 49 outputs the value of D I X W to the register 50. The data in the register 50 is added to the next multiplication result by the adder portion 49, the result of the addition is stored in the register 50. At last, the following calculation result is stored in the register 50:

$$\sum_i (DI_i \times W_i)$$

On finishing the calculation for association, the data stored in the register 50 is supplied to the thresholding portion 51. The thresholding portion 51 compares the calculation result of $$\sum_i (DI_i \times W_i)$$

with a threshold $\theta$ so as to determine an output DO.

The output DO is calculated for example as follows:
P (a-i)

$$DO = \phi\{\Sigma(DIi \times Wi) - \theta\}$$

where, $\phi(\ )$ means a regularizing function which may have performance as shown in FIGS. 7 (a) or (b). P (a-ii)

$$DO = S\{\Sigma(DIi \times Wi) - \theta\}$$

where, $S(\ )$ means a sigmoid function which may have performance as shown in FIGS. 7 (c) or (d).

In order to give the performances above to the thresholding portion 51, the thresholding portion 51 is provided with an electronic logic for calculation or a table etc. The table is more advantageous than the logic, on considering the flexibility of the thresholding portion 51. The performance of the thresholding portion 51 corresponds to the output performance of a neuron. The multiplication portion 48, adder portion 49, register 50 and thresholding portion 51 make up what called an output data generating portion.

The learning portion 47 has a weight variable determining portion 52 to which the data DI, DO and a reference DT are input. The data DT is a objective output to be outputted from the associative portion 46.

The weight variable determining portion 52 performs calculation such as following.

(b- i) Calculation accord to DI, DO and DT $$\delta = DT - DO$$

$$\Delta WR = \delta \times DI$$

$\delta$: Deviation of DO from DT;
$\Delta WR$: Reference value of weight variable;

This calculation is effective for evaluating the output DO so that a positive education is performed when DO is sufficiently correct or a negative education is performed when DO is not correct.

(b- ii) Calculation according to DI and DOR $$\Delta WR = DT \times DI$$

This calculation is effective for learning the objective output in response to the input.

(b-iii) Calculation according to DI and DO $$\Delta WR = DO \times DI$$

This calculation is effective for evaluating the output in macro point of view so that a positive education is performed when DO is correct in macro point of view or a negative education is performed when DO is not correct in macro point of view.

The output $\Delta WR$ from the weight variable determining portion 52 is inputted to a weight changing portion 53, to which the weight W is also inputted.

The weight changing portion 53 multiplies $\Delta WR$ by an efficiency C(W) then adds the multiplication result to the weight W by the adder portion 49.

$$W(T+1) = W(T) + C(W) \times \Delta YR$$

In this formula, W(T) means the current weight and W(T+1) means the changed weight. The efficiency C(W) is defined as a function of weight W. This function may have characteristics of monotonically decreasing function, as shown in FIGS. 8 (a) to (d). By defining the function C(W) as a monotonically decreasing function, initial education becomes highly progressive, as well as, the converging speed becomes high.

The adder portion 49 is commonly used by both of the associative portion 46 and learning portion 47. A selector 54 is connected to the input of the adder portion 49 for selecting the output of the register 50 or the weight changing portion 53. A selector 55 is connected to the other input of the adder portion 49 for selecting the output of the multiplication portion 48 or the weight W. The output of the adder port on 49 is connected to a input line toward the thresholding portion 51 as well as to a line toward the memory 45 for input/output of W. The line toward the memory is controlled by a bus buffer 56. Output data DO is supplied by the thresholding portion 51 to the memory 45 or is supplied by the memory 45 to the weight changing portion 52. For this switching of line, the output of the thresholding portion 51 is connected through a bus buffer 57 to the input-/output port of DO.

The associative portion 46 and the learning portion 47 may be remarkably improved in processing speed by constructing the circuit on a high speed LSI. In this case, since the reading and writing speed of the memory is much lower than the processing speed of the associative portion 46 and learning portion 47, a buffer 58 is connected to the input/output line for W, DO, DT and DI. On writing, the output from the associative portion 46 or learning portion 47 are stored in the buffer 58 in high speed, then the stored data is written in the memory 45 in a speed suitable for the memory 45. On reading, data is previously transmitted from the memory to the buffer 58; then the data is inputted to the portion 46 or 47 in high speed. A pipe-line architecture can be applied to the portions 46 and 49 for further improving their process speed.

The memory 45 may comprise a plurality of memories for each data or a single memory in which each data is allocated to different area from one another. The MPU 43 may be directly connected to the data bus of the memory 45. It is also possible to apply a graphic controller circuit for controlling great memory areas when the data occupies a lot of memory area.

Figure 10:
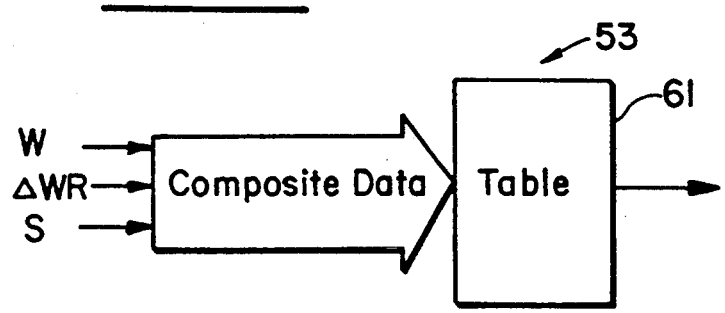
FIG. 10 shows a weight modification portion comprising a table.
Figure 11:
FIG. 11 shows an example of a composite data.

The weight changing portion 53 may be a calculation circuit for calculating W' from W and $\Delta WR$. It is also possible to construct the portion 53 by a table 61 as shown in FIG. 10. A composite data consisting of W and $\Delta WR$ is given to the table 61 as an address designation signal so as to output the calculation result stored in the table 61. The composite data may be a bit string including W and $\Delta WR$. When the negative education is performed, $\Delta WR$ is subtracted from the W, in other words, the sign of $\Delta WR$ is changed according to the education manner. In this case, a bit of teacher signal S is added to the bit string, as shown in FIGS. 10 and 11. The bit S changes the address to be designated, when S is changed, so that the calculation result of the weight changing portion is changed. When the weight changing portion is a calculation circuit, the teacher sign S is used as a control signal for the circuit. It is also possible to input the teacher signal to the weight variable determining portion 12 so as to control the sign of the $\Delta WR$.

Hereinafter, the learning method for the system above is explained in detail.

The pattern conversion system above may be modelized as shown in FIG. 12. The system has N layers each of which has n inputs and n outputs. Each layer may have n neuron, each input of the layer being input to every neuron in the layer. The learning method is explained in connection with the calculation from (b-i) to (b-iii).

(b-i)'

Hereafter, input data DI is deemed to consist of binary data from DIl to DIn and DO is deemed to be a binary data for easy understanding. Therefore, DT is also a binary data.

When DO=0, nevertheless DT=1, the neuron does not ignite, which is to ignite. Then a synapse to which DIi of "1" is inputted should be increased in weight so that the neuron can more easily ignite by the input inputted at that time. While when DO=1, nevertheless DT=0, the neuron ignites, which is not to ignite. Then a synapse to which DIi of "1" is inputted should be decreased in weight so that the neuron cannot ignite by the input inputted at that time.

the rule above is explained mathematically with respect to k-th synapse of j-th neuron in i-th layer as follows:

$$Wijk(T+1) = Wijk(T) + Cijk \times V(DIijk) \times W(DTij - DOij)$$

Wijk(t): Current weight at that time;
Wijk(T+1): Weight changed by judging the current output;
WIijk: Current input to the synapse;
DOij: Current output from the neuron;
DTij: Objective output of the neuron;
Cijk: Efficiency of weight variable;
V( ): Evaluation function for input;
W( ): Evaluation function for output;

The evaluation function may be a regularizing function, binarizing function, linear function etc.

The regularizing function may have a characteristics below:

$$\phi(x) = 1: x > 1$$
$$= 0: x = 0$$
$$= -1: x < 0$$

The binarizing function may have a characteristics below:

$$B(x) = 1: x > = \theta$$
$$= 0: x < \theta$$

$\theta$: Threshold;

The linear function may be explained mathematically as follows:

$$V(x) = x$$

The evaluation function evaluates the input whether it is significant or not.

The evaluation function for output includes an evaluation function for the difference between DTij and DOij. The evaluation of the difference is evaluation of Humming distance. Pythagorean distance, square root of the difference or others. The evaluation manner is performed for example by a regularizing function or binarizing function. the calculation result of V( ) and M( ) are ordinally connected by multiplication. This multiplication is multiplied by the efficiency Cij.

In the convectional learning method, Cij is usually deemed to be constant. According to the present invention, Cij is a function of weight W. Then Cij is explained as follows:

$$Cij(W)$$

On considering the convergence of the pattern conversion system, it is preferable that the weight variable is great in the initial learning and becomes smaller in the final learning. This characteristics can be defined by various parameters. The number of times of learning or the time duration of learning or the calculation result of M( ) may be such parameter. However, from the point of learning progress, the weight W is the most preferable for the parameter. The weight W has practically maxim and minimum and the range of the weight should be limited within minimum range for making the circuit as simple as possible. During the learning, the significant weight changes toward the maximum when the initial value is minimum, or changes toward the minimum when the initial value is maximum. So the weight reflects the learning progress. With respect to a learning progress of a synapse, the weight reflects more directly and precisely the progress than other parameters, because the weight changes monotonously with the learning progress and the weight is saturated when it reaches the maximum or minimum. Since other parameters has indirect connection with the change of the weight, it is difficult to define the progress or saturation of the learning by other parameters.

Cijk(Wijk) has characteristic of steep changes in initial learning and dull changes in final learning. It will substantially explained as follows:

$$dCijk(Wijk)/dWijk < = 1)$$

Therefore, Cijk(Wijk) is monotonous decreasing function. FIGS. 13 (a) to (d) are examples of characteristic of Cijk(Wijk).

Figure 14:
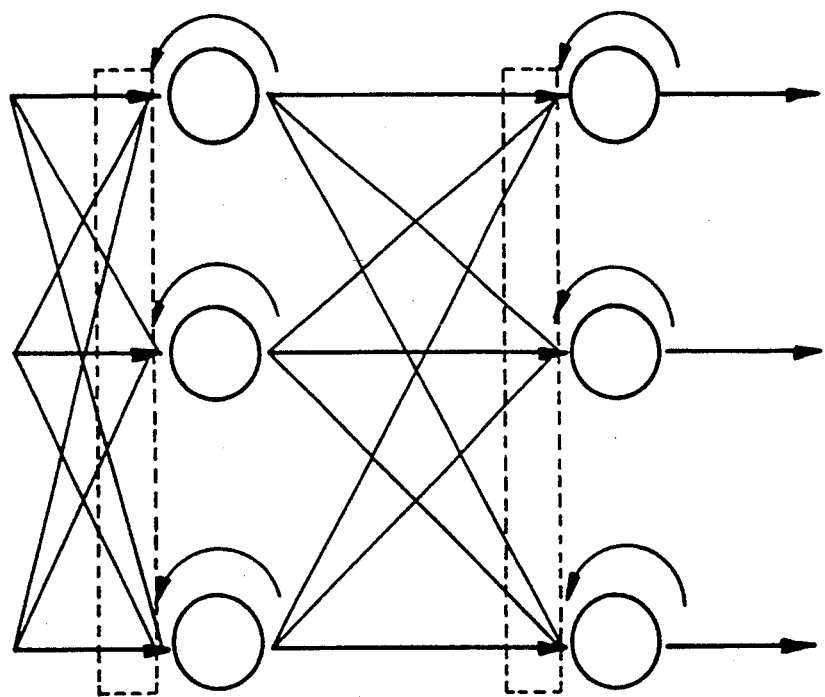
FIG. 14 is a diagram of a neural network showing the first learning method.
Figure 15:
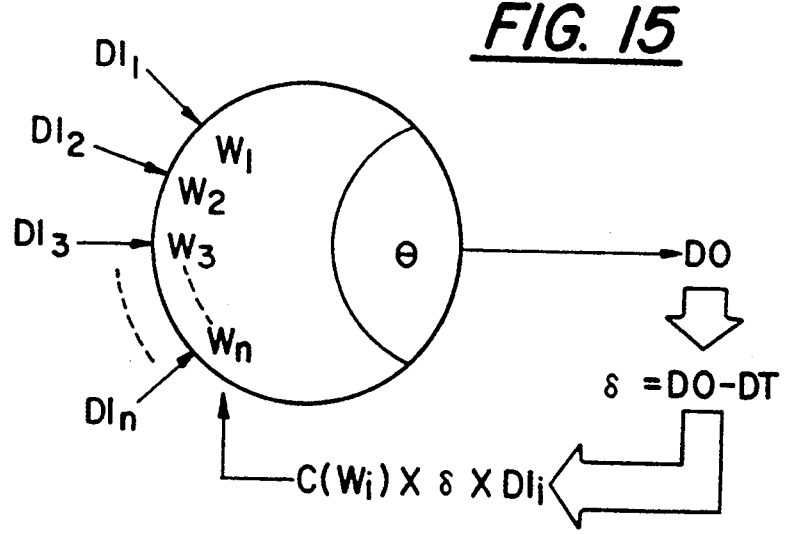
FIG. 15 is a diagram of a neuron showing the first learning method above.

This learning method is modelized as shown in FIGS. 14 and 15.

(b-ii)'

The learning method concerning the calculation (b-iii) is mathematically explained using parameters same as that of (b-i)', as follows;

$$Wijk(T+1) = Wijk(T) + Cijk(Wijk) \times V(DIijk)$$

Figure 16:
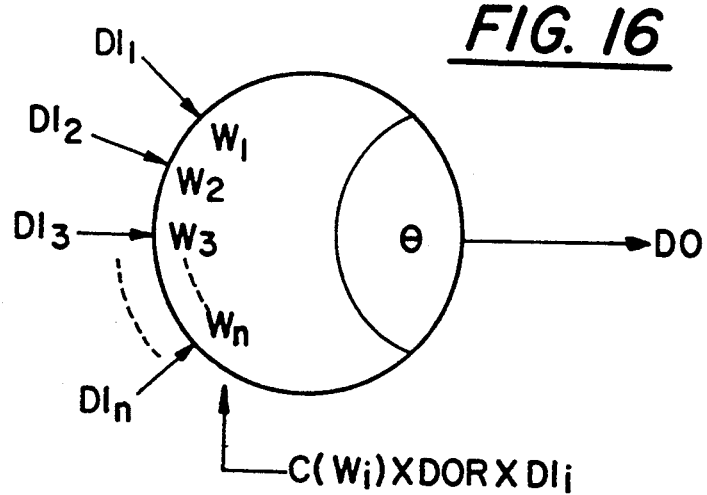
FIG. 16 is a diagram of neuron showing the second learning method.
Figure 17:
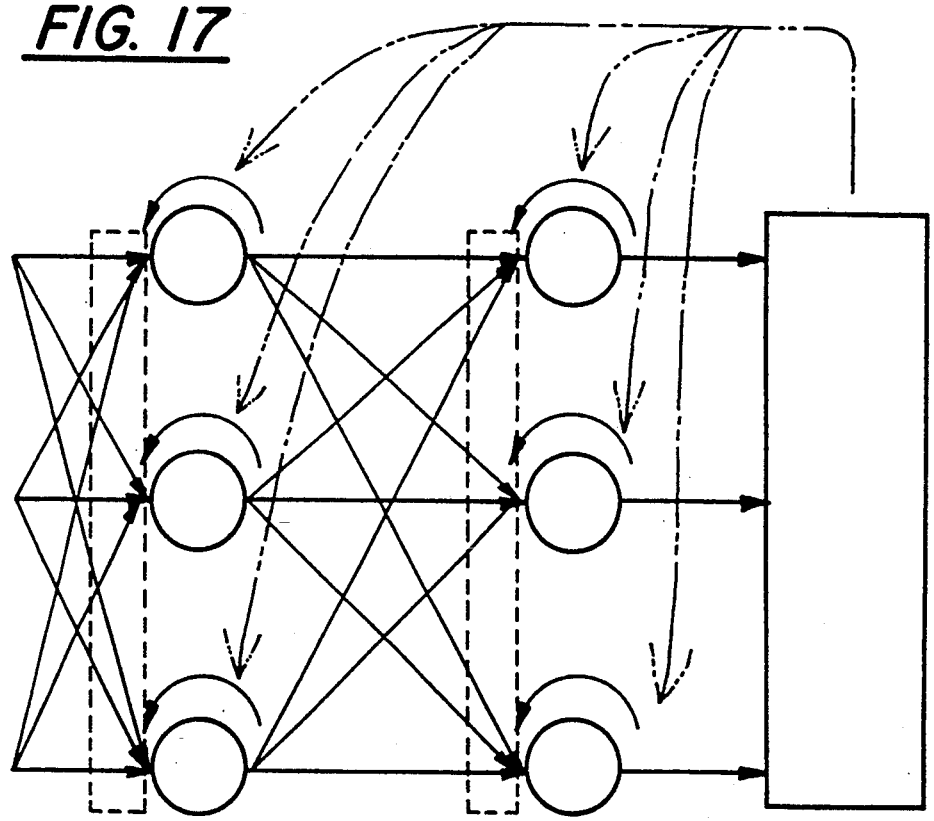
FIG. 17 is a diagram of a neural network showing the third learning method.
Figure 18:
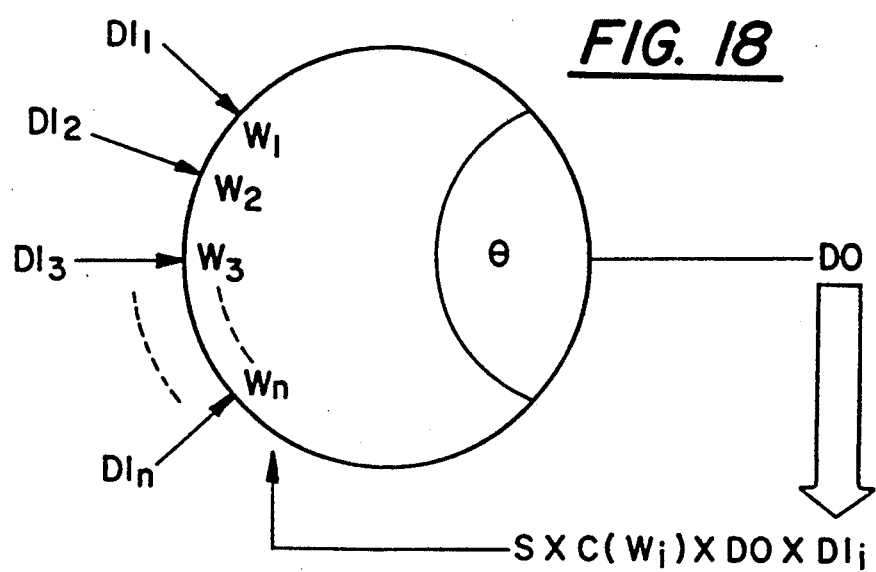
FIG. 18 is a diagram of a neuron showing the third learning method above.

This learning method is modelized as shown in FIGS. 14 and 16.

(b-iii)' the learning method concerning the calculation (b-ii) is mathematically explained using parameters same as that of (b-i)' follows;

$$Wijk(T+1) = Wijk(T) + S \times Cijk(Wijk) \times V(DIijk)$$

S: Teacher signal;

The teacher signal is designated according to the output of the last layer. In the simplest model, S=1 when the output is evaluated to be positive and S=0 when negative. Or S=0 when the evaluation result is neutral, S=-1 when the evaluation is negative.

Hereinafter, the third embodiment of a pattern conversion system is described in detail. This embodiment mainly relates to a construction of output lines.

Figure 19:
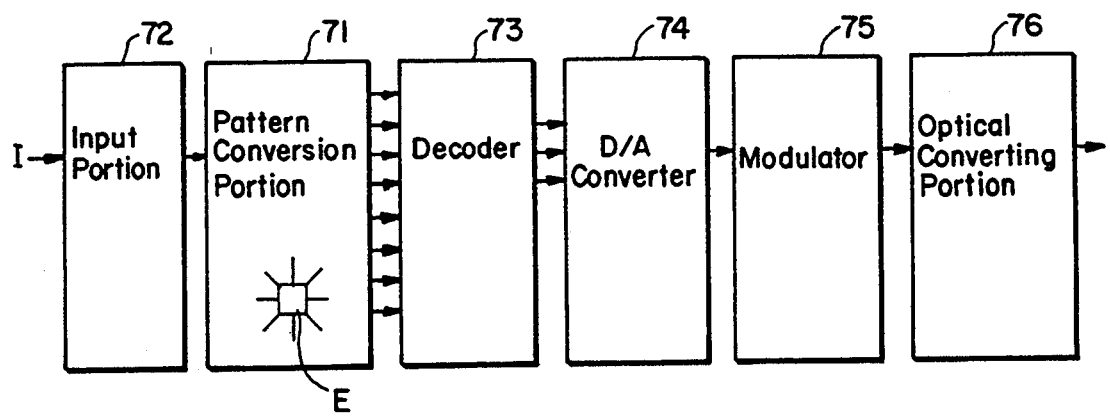
FIG. 19 is a block diagram of the third embodiment of the present invention.

In FIG. 19, a pattern conversion system comprises a pattern conversion portion 71 which is connected with an input portion 72. The input portion 72 may be an image processing portion of the first embodiment. When an analogue signal is input to the input portion 72, the input portion performs also A/D conversion.

The output of the pattern conversion portion may be input to a decoder 73, if necessary. Decoded data or compressed data is then input to D/A converter 74 for outputting an analogue data corresponding to the digital data inputted. The output of D/A converter 74 is input to a modulator 75 which outputs an output of a frequency corresponding to the amplitude of the analogue signal. The output of the modulator 75 is input to an optical converting portion 76. The optical converting portion 76 outputs an optical pulse with frequency determined by the modulator 75.

The output of the optical converting portion 76 is transmitted through an optical fiber so as to transmit total output of the pattern conversion portion 71 by one or a few output lines. Therefore, the pattern conversion system can be constructed by an integrated circuit without the problem of output lines.

Figure 20:
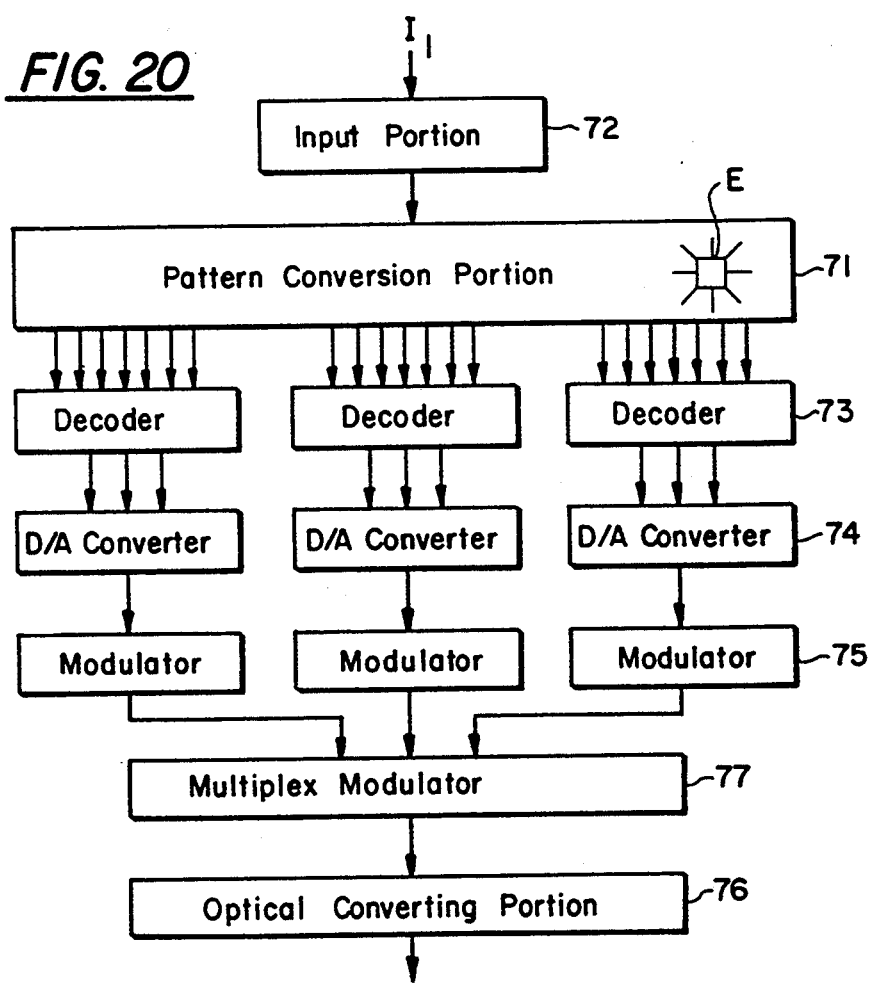
FIG. 20 shows a variation of the third embodiment.

FIG. 20 shows a variation of the third embodiment. The pattern conversion portion 71 outputs a plurality of bit strings each of which is input to a series of decoder 73, D/A converter 74 and modulator 75. The output of the pattern conversion portion 71 consists of the above bit strings. The total outputs from modulators 75 are input to a multiplex modulator 77 all together. The multiplex modulator 77 multiplexes the outputs of the modulators 75 to generate an multiplex analogue signal. The multiplexed analogue signal is input to an optical converting portion 76 which generates a multiplexed optical pulse representing the total output of the pattern conversion portion 71. By multiplexing the output of the pattern conversion portion 71, the number of circuits corresponding to a neuron can be increased without increasing the number of output lines from optical converting portion 76.

Figure 21:
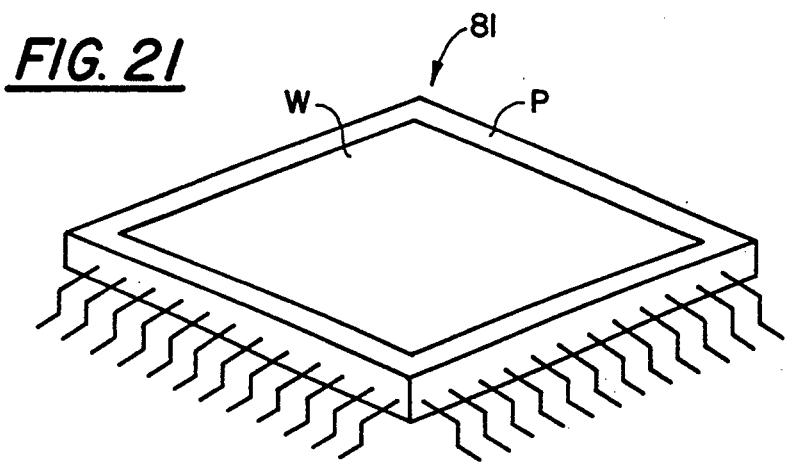
FIG. 21 is a perspective view of an integrated circuit for the fourth embodiment of the present invention.
Figure 22:
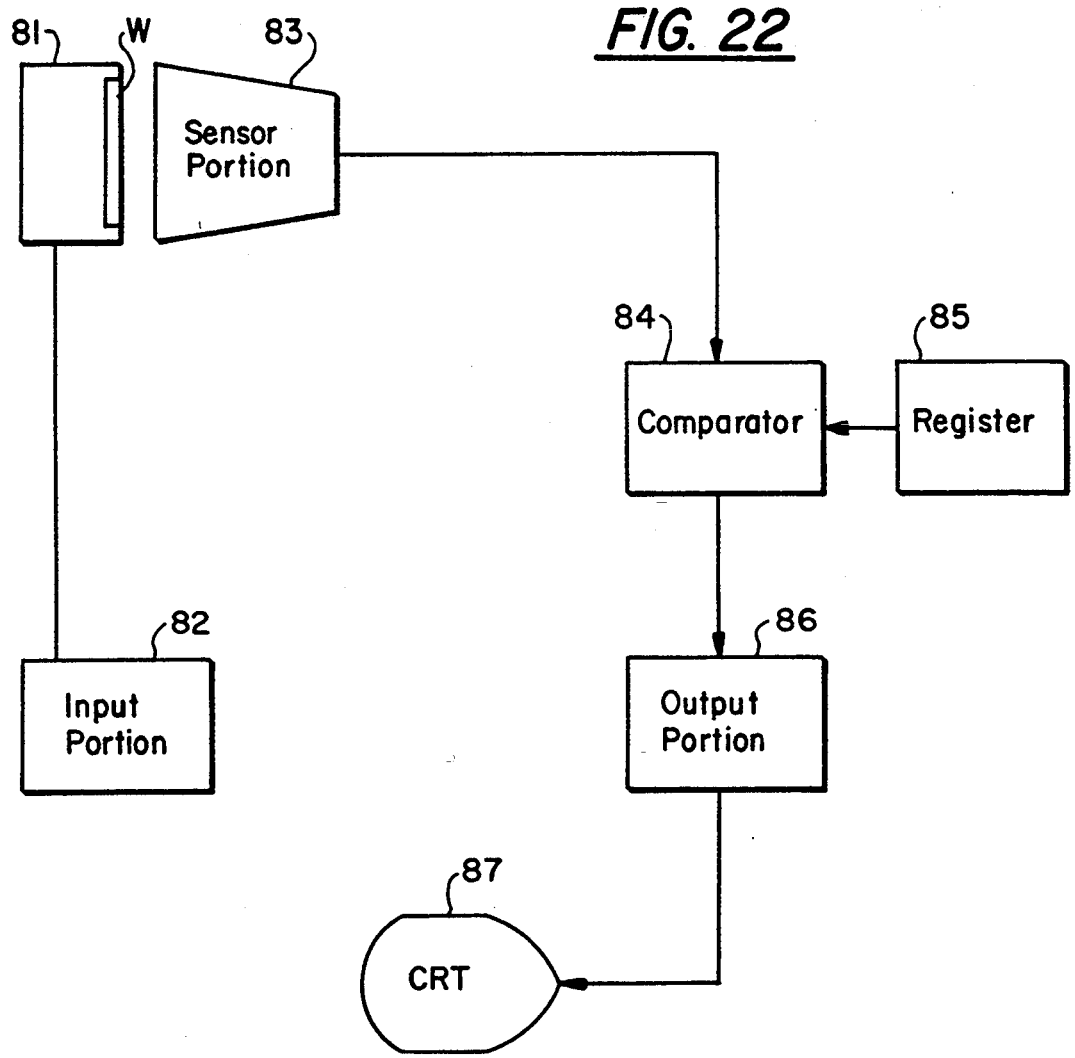
FIG. 22 is a block diagram of the fourth embodiment above.

FIGS. 21 and 22 show the fourth embodiment of the present invention. Similar to the third embodiment, the fourth embodiment relates to the problem of output lines.

In FIG. 22, a pattern conversion system comprises a pattern conversion portion 81 in which a plurality of circuits corresponding to neurons are constructed and connected so as to construct a neural network. The pattern conversion portion 81 is connected to an input portion 82, such as image processing portion similar to the first embodiment. The input portion 82 transmits the input pattern to the pattern conversion portion 81. The teacher signal can be input to the pattern conversion portion 81 from the input portion 82, if necessary. Each circuit of the pattern conversion portion 81 includes a luminous semiconductor such as GaAs semiconductor. The semiconductor luminesces when the neuron circuit ignites. As shown in FIG. 21, the pattern conversion portion 81 has a package P with a transparent window W through which the total neuron circuits can be observed. The igniting circuits can be detected by its luminance, so the total ignition pattern can be observed from outside of the package.

Therefore, since the pattern conversion portion 81 needs no output lines, the problem of number of output lines is perfectly solved.

The ignition pattern of the pattern conversion portion is detected by a sensor portion 83. The sensor portion 83 comprises image input tube, CCD or any other image receiving means and is facing to the window W of the pattern conversion portion. The sensor portion 83 detects the ignition pattern of the pattern conversion portion 81, then converts the ignition pattern to electronical signals to output to a comparator 84. The comparator 84 compares the inputted pattern with a patterns registered in register 85. The registered patterns correspond to characters or any other data to be recognized. The comparator receives successively registered patterns and calculates an identification ratio. The registered pattern with the highest identification ratio is transmitted to an output portion as a character code or any other suitable information for the processing in the output portion 86. The output portion 86 displays the comparison result on a cathode ray tube.

Figure 23:
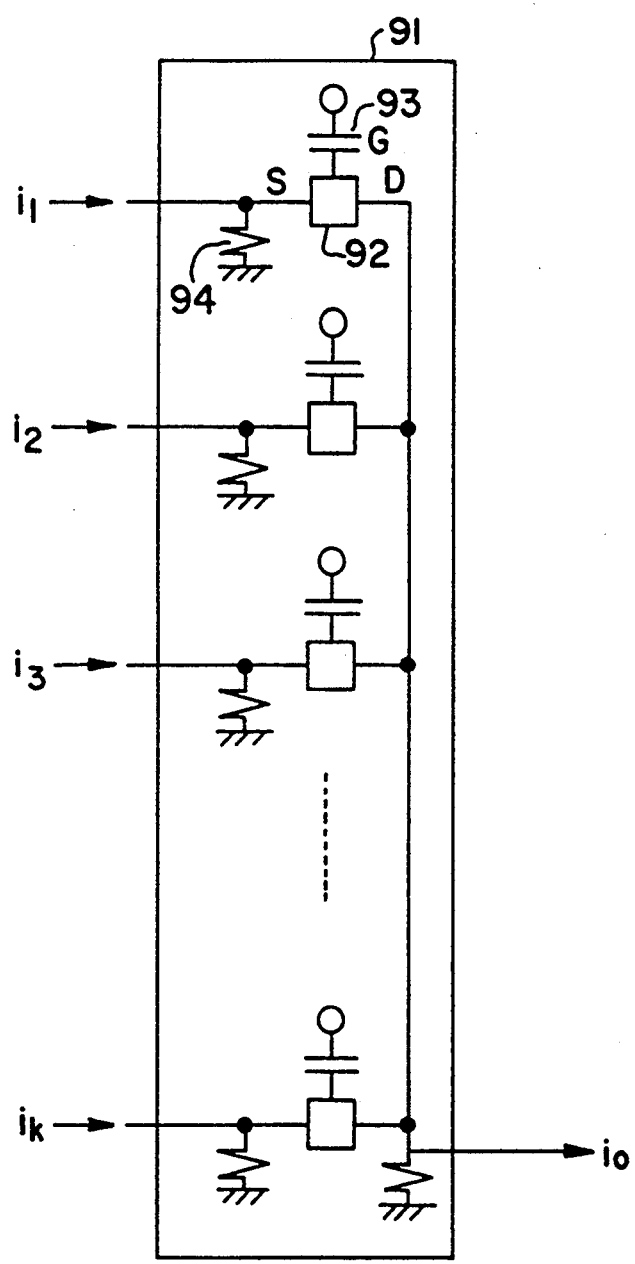
FIG. 23 is a circuit diagram of the fifth embodiment of the present invention.

FIG. 23 shows the fifth embodiment of the present embodiment. This invention relates mainly to a pattern converting circuit corresponding to a neuron.

The pattern conversion circuit 91 in FIG. 23 comprises a plurality of FET 92 each of which corresponds to a synapse. The source S of the FET is connected to an input from which input current ik is inputted. The gate G of the FET is connected to a capacitor 93. The gate voltage of the FET 92 is determined by the electric charge of the capacitor 93. The source S of the FET 92 is grounded through an input register 94. When the input current flows through the register 94 to the ground, a voltage is generated between source S and drain D. A drain voltage is generated according to the voltage between source and drain as well as the gate voltage. The higher the voltage between source and drain, the more the drain current. The lower the gate voltage, the more the drain current. The voltage of the capacitor 93 substantially corresponds to the weight of a synapse. The weight can be deemed to be increased when the voltage of the capacitor 93 lowered.

The total outputs of FETs are connected to a common output from which the total drain current flows as an output current io. The output current io is supplied to an input of other pattern conversion circuits as the input current.

Figure 24:
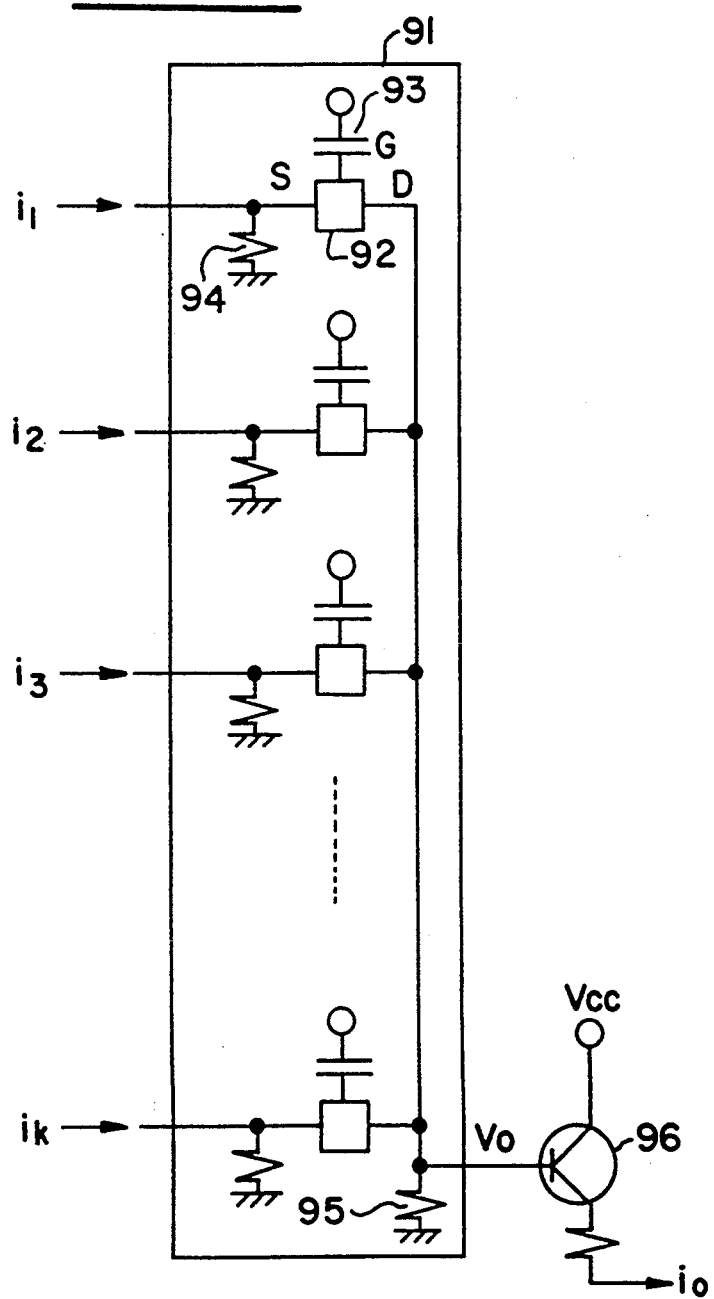
FIG. 24 is a variation of the fifth embodiment above.

FIG. 24 shows a variation of the fifth embodiment in FIG. 23. The output current in FIG. 23 is earthed through an output register 95 so as to generate an output voltage Vo. The output voltage Vo is supplied Vo is supplied to a base of an output transistor 96. The transistor 96 becomes conductive so as to generate output current Io when the output voltage Vo exceeds an predetermined value. The output register 95 corresponds to a threshold of a neuron which is changeable in wider range than that of FIG. 23.

In the embodiment of FIGS. 23 and 24, the learning is performed by changing the gate voltage of the FET. The gate voltage is decreased when the output is correct, and vice versa.

In FIG. 25 shows the sixth embodiment of the present invention. This embodiment mainly relates to a data base architecture using the pattern conversion system.

In FIG. 25, the data base comprises a pattern conversion portion 101 which associatively converts input patterns, similar to the embodiments above. The pattern conversion portion is supplied input patterns such as image data, acoustic data or document data. The pattern conversion portion 101 associatively converts the input pattern to output pattern. The output pattern is inputted to a conversion portion 102 which converts the output pattern to a data for designating an address of a data storage portion 103 where the data to be associated is stored.

The conversion portion 101 and 102 are initially made to learn the correct correlation between input and output. Then, when a input pattern is inputted to the conversion portion 102, the conversion portion 102 outputs address of the memory 103 where a data to be associated is stored.

FIG. 26 shows a table representing the relationship between the output Ok of the conversion portion 101 and the address Ak to be outputted from the conversion portion 102.

Furthermore, there is provided a searching portion 104 which generates a content stored in the memory 103 according to the output Ok from the conversion portion 101. Therefore, the conversion portion 102 can be substituted by the searching portion 104.

The searching portion may be useful for directly reading data the conversion portion cannot easily associate. After a learning, it is possible that some data in the memory 103 can be scarcely read out due to remote relationship between any input patterns and the data. In this case, the searching portion is effective for calling the forgotten data.

The searching portion 104 may comprise content addressable memory and so forth.

When a data to be associated is a document data as shown in FIG. 27, by inputting a part of a document data or a incomplete data to the conversion portion 101, document data above can be designated in the data storage portion.

Figure 28:
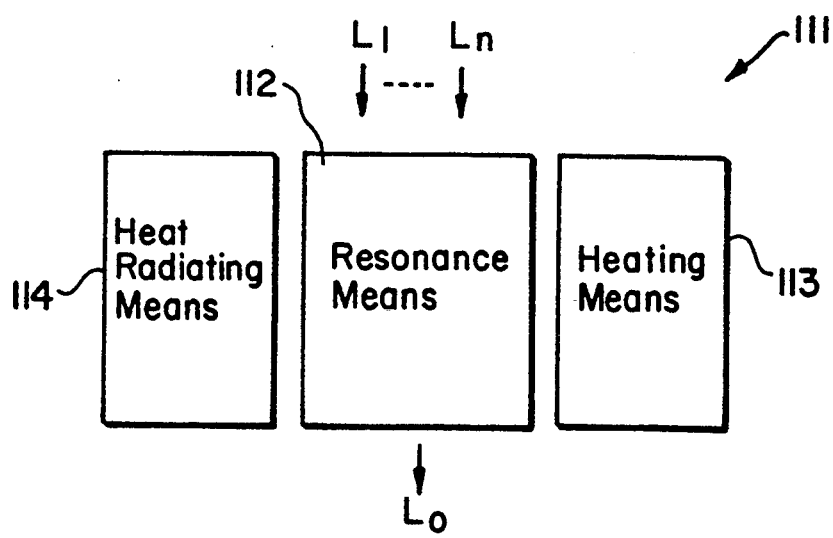
FIG. 28 shows a schematic diagram of the seventh embodiment.
Figure 30:
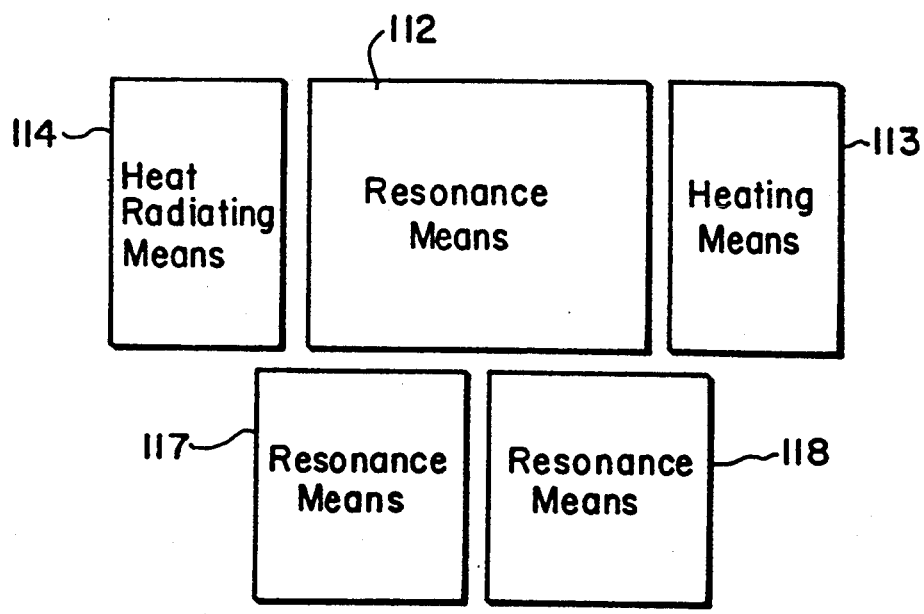
FIG. 30 shows a variation of the seventh embodiment of the present invention.
Figure 29:
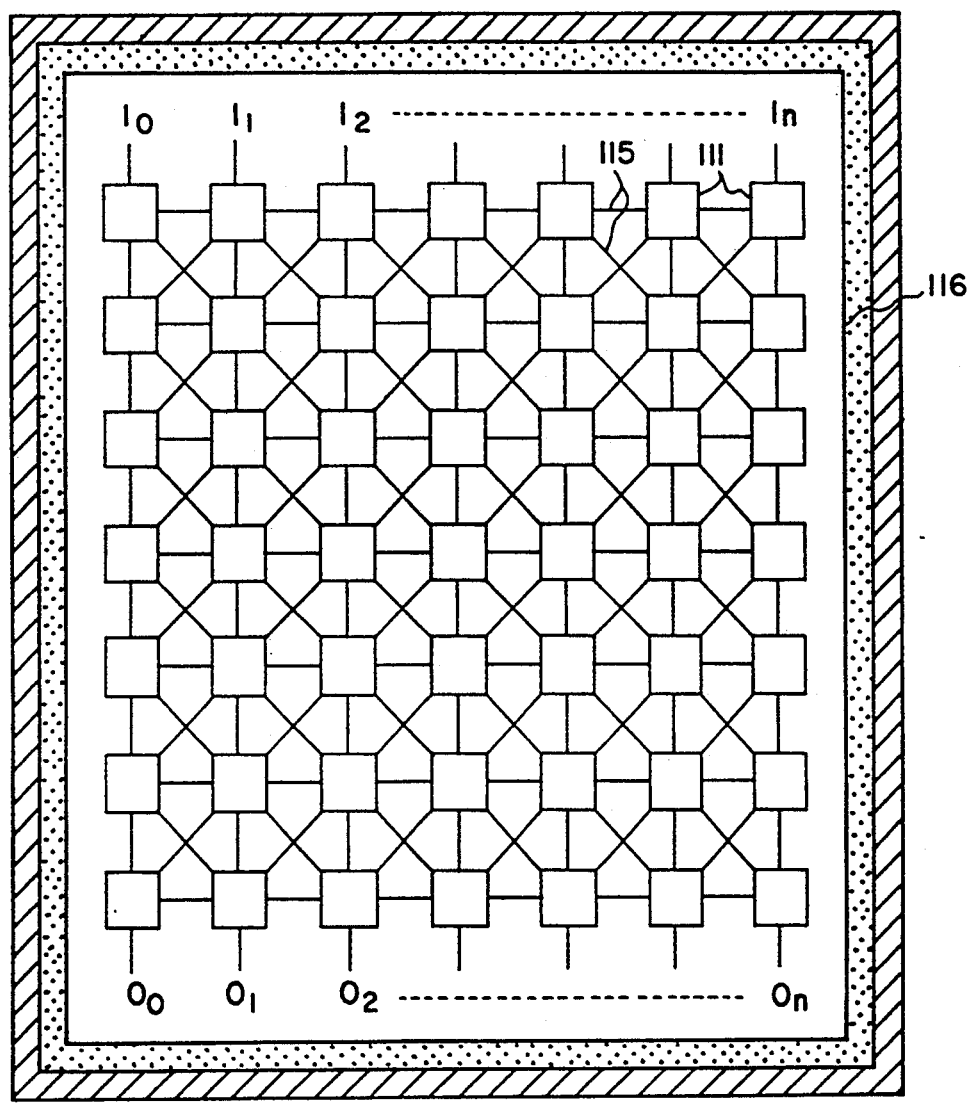
FIG. 29 shows a neural network consisting of pattern conversion portion in FIG. 28.

FIGS. 28 to 30 show a seventh embodiment of the present invention.

In FIG. 28, the pattern conversion portion 111 comprises laser resonance means 112 to which a plurality of laser beams of incidence L1 to Ln are given. The resonance means 112 performs frequency intermixture of the laser beams and emits an output beam Lo.

The resonance means 112 comprises a conventional means, such as a solid laser generating medium and a reflecting mirror. A heating means 113 are positioned adjacent to the resonance means 111. The heating means 112 generates far infrared ray or Joule's heat etc. The resonance means 111 is controlled in the direction of phase coordination by the heating means 113 so that the output beams is changed in spectrum and intensity.

A heat radiation means 114 is positioned adjacent to the resonance means 111, as well. The heat radiation means 114 refrigerates the resonance means 112 after heated by the heating means 113 so as to make the resonance means to be an adequate temperature, if necessary.

FIG. 29 shows a network consisting of a plurality of the pattern conversion portions 111.

The output beam Lo is provided in parallel through a light transmission means 115 such as optical fiber to other pattern conversion portions, as the laser beam of incidence. A pattern conversion portion is given output beams from a plurality of pattern conversion portions.

The network is incorporated within a casing made of a laser absorbable wall 116. A leaked laser is absorbed by the wall 116 so as to eliminate noises to the pattern conversion portions. Some pattern conversion portion are used as input portions to which input laser beams Io to In are given. Some other pattern conversion portions are used for output, the output beams of which are introduce to the outside of the casing.

When the input beams Io to In are input to the network, the input beam pattern is converted due to frequency intermixture, then associative output beam pattern is generated. The correlation between the input pattern and the output pattern is defined by the direction of phase coordination, when the connection between the pattern conversion portions are determined. The phase coordination direction is controlled by the heating means 113 and heat radiation means 114. Therefore, the correlation between input and output patterns are suitably adjusted for association by controlling the heating and heat radiation means. The means 113 and 114 may be controlled by feed-back control so as to adjust the correlation in the manner of self-organization.

FIG. 30 shows a variation of the seventh embodiment, wherein the resonance means 112 emits a couple of output beams caused by parametric oscillation. The heating and heat radiation means 113 and 114 control the phase coordination condition of a solid laser generating medium. On the output side of the resonance means 112, a couple of resonance means 117 and 118 are positioned. When the phase coordination condition is controlled, the combination of output beams from the resonance means 112 is changed. The resonance means 117 and 118 have maximal gain for a predetermined resonance frequency. The resonance means 117 and 118 output beams with intensity according to the difference between the resonance frequency and the frequency of the beam inputted from the resonance means 112.

Therefore, the spectrum and intensity of the output beams from the resonance means 117 and 118 are changed according to the combination of output beams from the resonance means 112.

In the embodiment of FIGS. 28 to 30, the pattern conversion portion converts pattern as analogue signals; much more information is processed than the digital type pattern conversion portion. Furthermore, multiplexing output can be easily obtained because the output signal is an optical signal.

FIGS. 31 to 34 show the eighth embodiment of the present invention relating to an optical pattern conversion portion.

Figure 31:
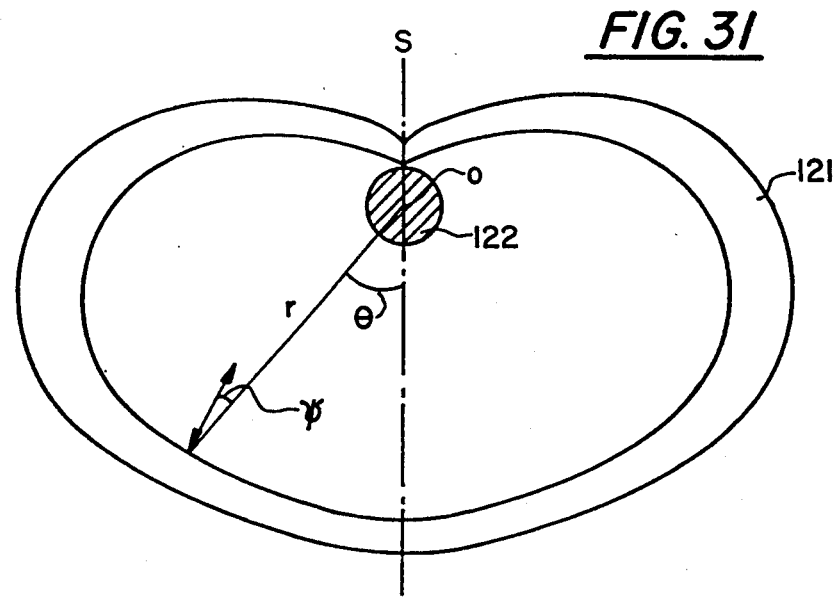
FIG. 31 shows a sectional view of a associative converting portion of the eighth embodiment of the present invention.
Figure 32:
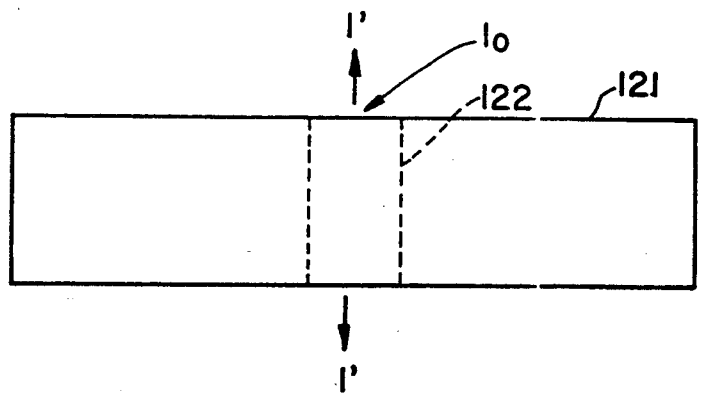
FIG. 32 is a front view of the associative converting portion in FIG. 31.

In FIGS. 31 and 32, the pattern conversion portion comprises a laser medium ring 121 and an input/output laser medium 122 which is positioned within the ring 121. The ring 121 consists of a plurality of converting laser medium 123 (FIGS. 33 and 34), which face toward inside of the ring 121. The converting laser medium is made of a material with high non-linear optical effect so that frequency of the output beam lout is changed in response to the incidence angle of the input beam lin.

The configuration of the inner surface of the ring 121 is defined so that the normal line on each point meets at a predetermined angle $\Psi$ with the line toward the center O of the laser medium 122, as shown in FIG. 31. Therefore, the laser beam from the laser medium 122 is reflected successively toward different laser mediums 123. The inner configuration of the ring may be defined by the following formula using references in FIG. 31.

$$\cos = -\tfrac{1}{2} d\, dr$$

where, r: Distance from the center O to the inner surface of the laser medium;
θ: Angle from the axis S of symmetry;
Ψ: Angle between the normal line and the line toward the center O.

The laser beam emitted from the laser medium 122 is inputted to one of the laser medium 123, then is converted in frequency and emitted with an angular deviation from the line of incidence. The emitted laser beam is inputted to another laser medium 123 or to the laser medium 122.

The laser medium 122 has high non-linear optical performance with capability of frequency conversion.

The characteristics of frequency conversion by the laser mediums 122 and 123 are changed according to the angle of incidence.

When an input laser beam Io is inputted to the laser medium 122, as shown in FIG. 32, the laser medium 122 is excited so as to emit laser beams omnidirectly. The emitted laser beams are inputted to all of the laser medium 123. In the laser medium 123, the laser beam is converted in frequency and emitted toward another laser medium 123 or laser medium 122. The laser medium also performs frequency conversion and is able to emit converted laser beam toward a laser medium 123.

There are two types of frequency conversion manners.

One type is explained by the following formula.

$$w1 + w2 + w3 + \ldots + wn = wo \qquad (1)$$

where
wo: Frequency of input laser beam;
wi: Frequency of output laser beams;

The other type is explained by the following formula.

$$w = w1 + w2 + \ldots + vn \qquad (2)$$

where,
w: Frequency of output laser beam;
wi: Frequency of input laser beam;

When, at first, the input laser beam Io is inputted to the laser medium 122, the laser medium 122 emits a laser beam of the same frequency as that of input laser beam Io toward all of the laser medium 123. The laser beam from the laser medium 122 is converted in the laser medium 123. In the converting manner of the former type. The laser medium 122 performs the conversion of the latter type.

At a point of time, a series of laser beams I1 to In is inputted to the laser medium 122, the frequencies of the laser beams are as follows:

$$w1 = w0\, gs1$$
$$w2 = w0\, gs2$$
$$\ldots$$
$$wn = w0\, gs3$$

where,
wi: Frequency of the laser beam Ii;
si: i-th series;
gsi: Conversion series of i-th series;
wo: Operator of composite conversion;

The laser medium 122 performs the latter conversion of formula (2) and emits an output beam I' with frequency w'. This w' is represented by the following formula.

$$w' = w0 \sum_i gsi$$

At this point of time, the laser medium 122 emits a laser beam representing a lot of conversion. Therefore, various combination of series of conversion can be obtained, which corresponds to a conversion by enormous number of neurons. A pattern conversion of neural network of large scale can be developed by rather small number of laser media. Since the optical propagation speed is such higher than the electronical propagation speed, the conversion speed of this embodiment is higher than the electronical neural network.

Figure 33:
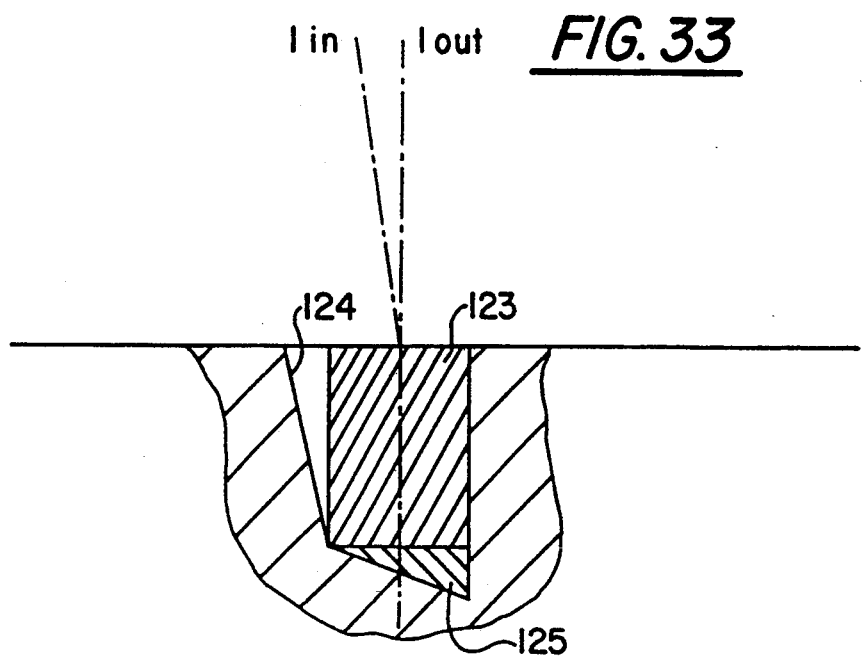
FIG. 33 shows a sectional view of laser converting medium of the eighth embodiment of the present invention.
Figure 34:
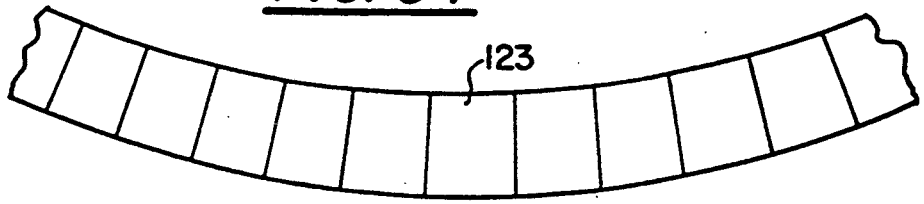
FIG. 34 is a plan view of the laser converting medium in FIG. 33.

As shown in FIG. 33, the laser medium 123 is held in a recess 124 shaped on the inner surface of the ring 121. A piezoelectric element 125 is positioned at the bottom of the recess 124. The element 125 is shaped as a wedge touching to the bottom of the laser medium 123.

When the element 125 is deformed by controlling voltage, the thicker portion of the wedge has more strain, so the wedge inclines the laser medium 123. By this inclination, the angle of incidence of the laser medium 123 is changed, then the frequency conversion characteristics is changed. The adjustment of the frequency conversion characteristics corresponds to learning or adaptation of neural network. The correlation between Io and I' is adequately defined.

For the adaptation, a method of trial and error may be applied. Since the number of laser medium can be small, the trial times may be limited in small range.

It is preferable to make the inside of the ring vacuum so as to minimize the attenuation of the laser beam.

Though the modification or substitution may possible in various way concerning to the present invention, some special embodiments are constructed and described in detail. It is not intended to limit this invention in a special form or condition described, but to conclude any variation, substitutions and equivalents within the spirit of the present invention defined in claims.

What is claimed is:

1. An associative pattern conversion system for allowing recognition of an input signal, said conversion system comprising:
   generating means for sensing a first object and for generating input data which is representative of selected characteristics of said sensed first object;
   a memory for storing at least said input data, weight data, output data nd reference data;
   weight variable determining means for evaluating a relationship between said input data, said output data and said reference data stored in said memory and determining the value of a weight variable based on said relationship so as to decrease said weight variable over time in such a manner that said weight variable never increases;
   weight changing means for changing said weight data, which is stored in said memory, in accordance with said weight variable; and
   recognition means for receiving said input signal, and for outputting, based upon said input signal and said weight data, an associated recognition signal.

2. An associative pattern conversion system according to claim 1, wherein said weight variable determining means multiplies said output data by said input data.

3. An associative pattern conversion system according to claim 1, further comprising:

means for multiplying each of said input data with a corresponding one of said weight data,
means for integrating said multiplication results, and
means for generating an output data according to a difference between said integration result and a threshold.

4. An associative pattern conversion system according to claim 3, wherein said difference between said integration result and said threshold is determined by a table of predetermined values.

5. An associative pattern conversion system according to claim 4, wherein said table is rewritable.

* * * * *